US012701325B2

(12) United States Patent
Cui

(10) Patent No.: US 12,701,325 B2
(45) Date of Patent: Aug. 4, 2026

(54) METHOD AND APPARATUS FOR CONTROLLING AERIAL VEHICLE TO SHOOT BASED ON PORTRAIT MODEL, DEVICE, AND MEDIUM

(71) Applicant: AUTEL ROBOTICS CO., LTD., Shenzhen (CN)

(72) Inventor: Guangxin Cui, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 50 days.

(21) Appl. No.: 18/612,324

(22) Filed: Mar. 21, 2024

(65) Prior Publication Data

US 2024/0236486 A1    Jul. 11, 2024

Related U.S. Application Data

(63) Continuation of application No. PCT/CN2022/121061, filed on Sep. 23, 2022.

(30) Foreign Application Priority Data

Sep. 23, 2021    (CN) ........................... 202111114607.9

(51) Int. Cl.
*H04N 23/667* (2023.01)
*H04N 23/611* (2023.01)

(52) U.S. Cl.
CPC ......... *H04N 23/667* (2023.01); *H04N 23/611* (2023.01)

(58) Field of Classification Search
CPC ... H04N 23/667; H04N 23/611; H04N 23/695
See application file for complete search history.

(56) References Cited

U.S. PATENT DOCUMENTS

2018/0109767 A1* 4/2018 Li ........................ G05D 1/0038
2021/0142071 A1   5/2021 Sugaya

FOREIGN PATENT DOCUMENTS

CN        104917966 A    9/2015
CN        105518487 A    4/2016
              (Continued)

OTHER PUBLICATIONS

WO-2021133918-A1 (Aerial Camera device, systems, and Methods) by Stroppiana Marco et al. (Published on Jul. 1, 2021) (Year: 2021).*

(Continued)

*Primary Examiner* — Yogesh K Aggarwal

(57)        ABSTRACT

Embodiments of the present disclosure disclose a method and apparatus for controlling an aerial vehicle to shoot based on a portrait mode, a device, and a medium. The method includes: receiving a portrait shooting instruction from a user, and controlling an aerial vehicle to enter a portrait mode according to the portrait shooting instruction; if the aerial vehicle has taken off, acquiring an actual distance between the aerial vehicle and the user, and comparing the actual distance with a preset distance; if the actual distance is greater than the preset distance, controlling the aerial vehicle to move to a recommended position, wherein when the aerial vehicle is on the recommended position, a shooting picture of the aerial vehicle includes a shooting target; and receiving a shooting starting instruction from the user, and shooting the shooting target according to the shooting starting instruction.

17 Claims, 5 Drawing Sheets

(56) References Cited

FOREIGN PATENT DOCUMENTS

| | | | |
|---|---|---|---|
| CN | 106791443 | A | 5/2017 |
| CN | 107071389 | A | 8/2017 |
| CN | 107370946 | A | 11/2017 |
| CN | 107817813 | A | 3/2018 |
| CN | 108985193 | A | 12/2018 |
| CN | 110119154 | A | 8/2019 |
| CN | 110691190 | A | 1/2020 |
| CN | 112637507 | A | 4/2021 |
| CN | 113784051 | A | 12/2021 |
| JP | 2001025002 | A | 1/2001 |

OTHER PUBLICATIONS

CN-110119154-A (Control Method, Device and Equipment and Aircraft of the Aircraft) Zhou, You et al. (Published on Aug. 13, 2019). (Year: 2019).*
The International Search Report mailed Mar. 30, 2023; PCT/CN2022/121061 with English Translation.
The First Chinese Office Action dated Dec. 14, 2022; Appln. No. 202111114607.9 with English Translation.
The Second Chinese Office Action dated Dec. 14, 2022; Appln. No. 202111114607.9 with English Translation.
The Third Chinese Office Action dated Dec. 14, 2022; Appln. No. 202111114607.9 with English Translation.

* cited by examiner

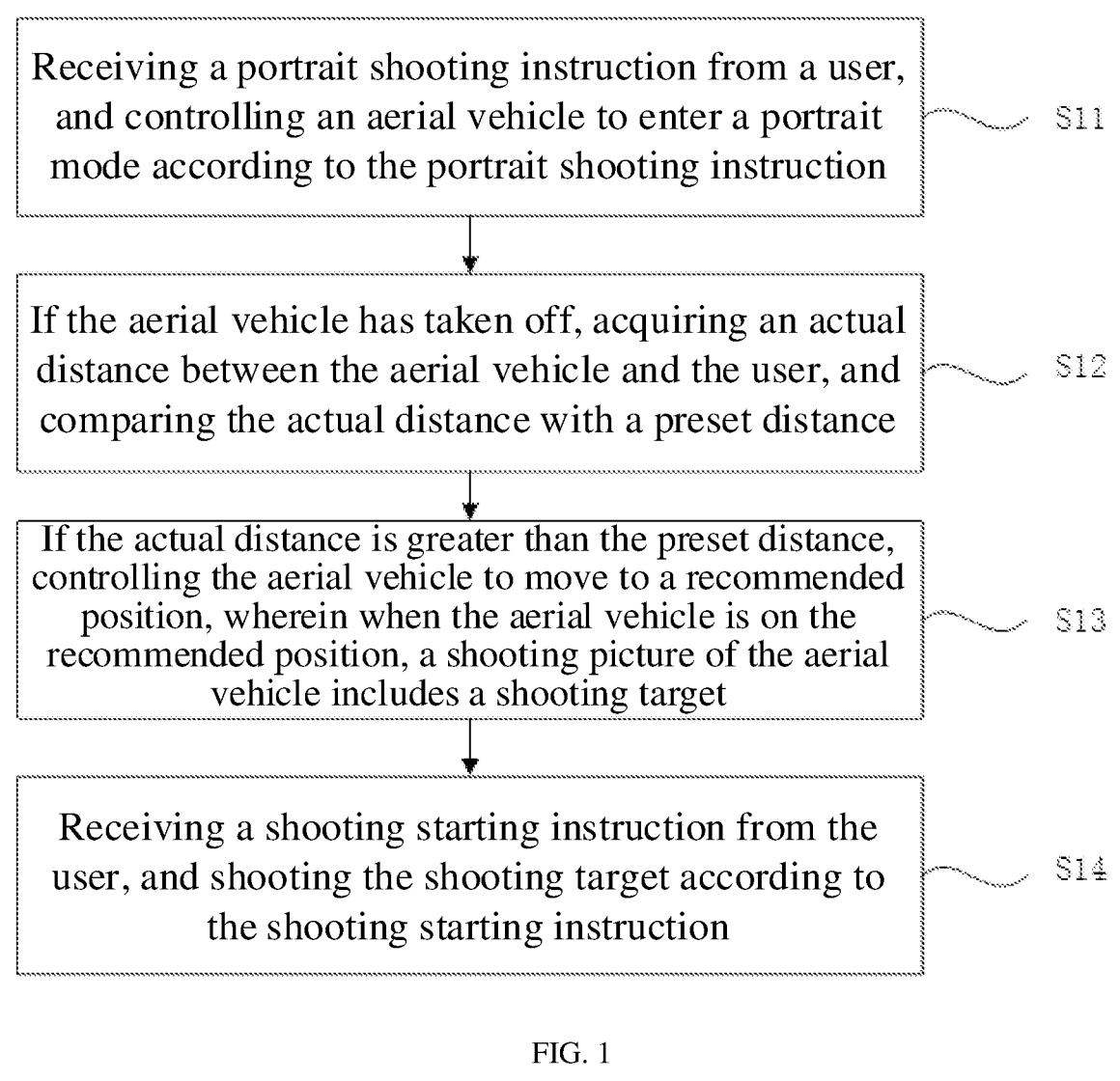

Receiving a portrait shooting instruction from a user, and controlling an aerial vehicle to enter a portrait mode according to the portrait shooting instruction ⌇⌇⌇ S11

If the aerial vehicle has taken off, acquiring an actual distance between the aerial vehicle and the user, and comparing the actual distance with a preset distance ⌇⌇⌇ S12

If the actual distance is greater than the preset distance, controlling the aerial vehicle to move to a recommended position, wherein when the aerial vehicle is on the recommended position, a shooting picture of the aerial vehicle includes a shooting target ⌇⌇⌇ S13

Receiving a shooting starting instruction from the user, and shooting the shooting target according to the shooting starting instruction ⌇⌇⌇ S14

FIG. 1

METHOD AND APPARATUS FOR CONTROLLING AERIAL VEHICLE TO SHOOT BASED ON PORTRAIT MODEL, DEVICE, AND MEDIUM

CROSS REFERENCE

This application is a continuation of International Patent Application No. PCT/CN2022/121061, filed Sep. 23, 2022, which claims the benefit of and priority to Chinese Patent Application No. 2021111146079, filed Sep. 23, 2021, the entireties of which are herein incorporated by reference in their entireties.

RELATED ART

A portrait mode is also referred to as an image mode or a portrait effect, that is, a blurring effect of an entire photo is ensured by deeply learning face features, a background can be blurred to highlight a subject when a photo is taken, and the portrait mode is also suitable for objects other than portraits, thereby satisfying more shooting demands in the daily life of people. At present, an exclusive mode for portrait shooting has not been solved in a process of shooting by using an aerial vehicle. When a user wants to shoot a portrait through an aerial vehicle, it is necessary to manually adjust a lens position of the aerial vehicle through a remote control lever of a remote controller. The adjustment process is very troublesome, a lot of time is taken, and it is difficult to adjust the lens position to a relatively appropriate status.

SUMMARY

Embodiments of the present disclosure relate to the technical field of unmanned aerial vehicle control, in particular to a method and apparatus for controlling an aerial vehicle to shoot based on a portrait mode, a device, and a medium.

Embodiments of the present disclosure provide a method and apparatus for controlling an aerial vehicle to shoot based on a portrait mode, a device, and a medium to realize shooting in the portrait mode through the aerial vehicle, and automatically control the aerial vehicle to move to a shooting position adapted to the portrait mode, thereby reducing user operations, and providing convenience for a user.

In a first aspect, an embodiment of the present disclosure provides a method for controlling an aerial vehicle to shoot based on a portrait mode, wherein the method includes:

receiving a portrait shooting instruction from a user, and controlling an aerial vehicle to enter a portrait mode according to the portrait shooting instruction;

when the aerial vehicle has taken off, acquiring an actual distance between the aerial vehicle and the user, and comparing the actual distance with a preset distance;

when the actual distance is greater than the preset distance, controlling the aerial vehicle to move to a recommended position, wherein when the aerial vehicle is on the recommended position, a shooting picture of the aerial vehicle includes a shooting target; and receiving a shooting starting instruction from the user, and shooting the shooting target according to the shooting starting instruction.

In a second aspect, an embodiment of the present disclosure further provides an apparatus for controlling an aerial vehicle to shoot based on a portrait mode, wherein the apparatus includes:

a user instruction receiving module configured to receive a portrait shooting instruction from a user, and control an aerial vehicle to enter a portrait mode according to the portrait shooting instruction;

an actual distance acquisition module configured to, if the aerial vehicle has taken off, acquire an actual distance between the aerial vehicle and the user, and compare the actual distance with a preset distance;

a recommended movement control module configured to, if the actual distance is greater than the preset distance, control the aerial vehicle to move to a recommended position, wherein when the aerial vehicle is on the recommended position, a shooting picture of the aerial vehicle includes a shooting target; and a target shooting module configured to receive a shooting starting instruction from the user, and shoot the shooting target according to the shooting starting instruction.

In a third aspect, an embodiment of the present disclosure further provides an electronic device, wherein the electronic device includes:

one or more processors; and a memory configured to store one or more programs;

when the one or more programs are executed by the one or more processors, the one or more processors being enabled to implement the method for controlling the aerial vehicle to shoot based on the portrait mode according to any embodiment of the present disclosure.

In a fourth aspect, an embodiment of the present disclosure further provides a computer-readable storage medium, having a computer program stored thereon, wherein the program, when executed by a processor, implements the method for controlling the aerial vehicle to shoot based on the portrait mode according to any embodiment of the present disclosure.

BRIEF DESCRIPTION OF THE DRAWINGS

FIG. 1 is a flow diagram of a method for controlling an aerial vehicle to shoot based on a portrait mode according to at least one embodiment of the present disclosure;

DETAILED DESCRIPTION

The present disclosure will be further described in detail below in conjunction with the accompanying drawings and embodiments. It can be understood that specific embodiments described herein are only intended to explain the present disclosure, rather than to limit the present disclosure. In addition, it should be also noted that, for facilitating description, parts, but not all structures correlated to the present disclosure, are only shown in the accompanying drawings.

Before exemplary embodiments are discussed in more detail, it should be mentioned that some exemplary embodiments are described to be used as processing or methods described in a flow diagram. Although all the steps are described to be processed in order in the flow diagram, many steps therein can be performed in parallel, concurrently or at the same time. In addition, an order of all the steps can be rearranged. When an operation of the steps is completed, the processing can be ended, however, there may also be additional steps not included in the accompanying drawings. The processing can correspond to a method, a function, a regulation, a subroutine, a subprogram, etc.

FIG. 1 is a flow diagram of a method for controlling an aerial vehicle to shoot based on a portrait mode according to embodiment of the present disclosure. The present embodiment is suitable for a situation that a target object is automatically shot in a portrait mode by using an aerial vehicle, the method can be performed by an apparatus for controlling an aerial vehicle to shoot based on a portrait mode according to an embodiment of the present disclosure, the apparatus can be implemented by means of hardware and/or software, and can be generally integrated in an electronic device, and the electronic device can include, but is not limited to a smartphone and a tablet computer. As shown in FIG. 1, the method specifically includes the following steps:

S11, a portrait shooting instruction from a user is received, and an aerial vehicle is controlled to enter a portrait mode according to the portrait shooting instruction.

Figure 2:
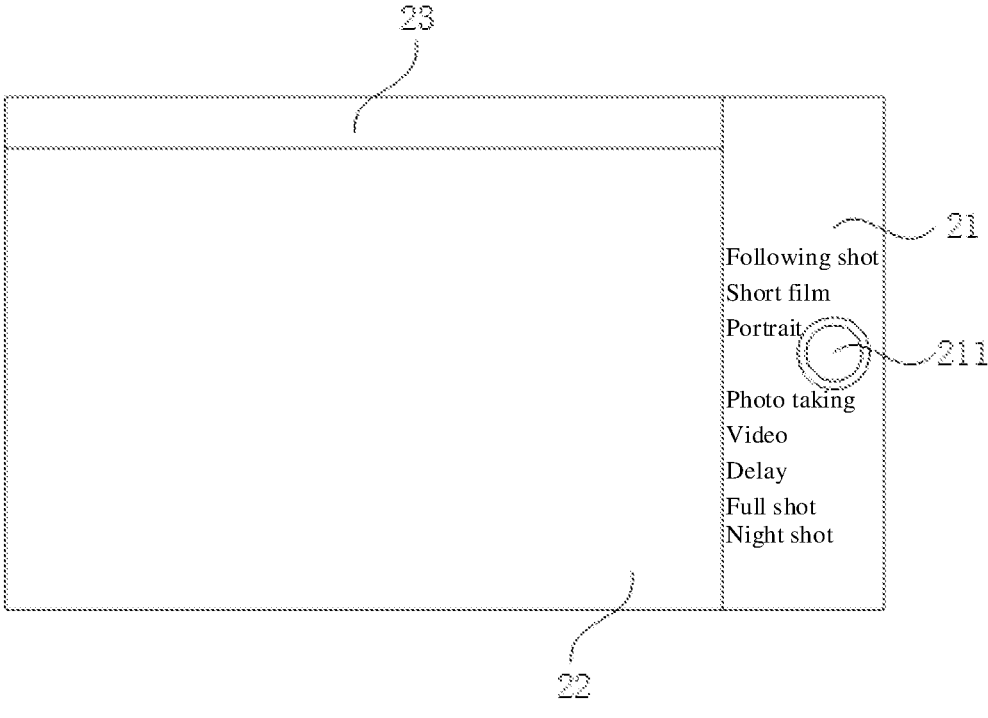
FIG. 2 is a schematic structural diagram of an interaction interface provided after entering an application according to at least one embodiment of the present disclosure.
Figure 3:
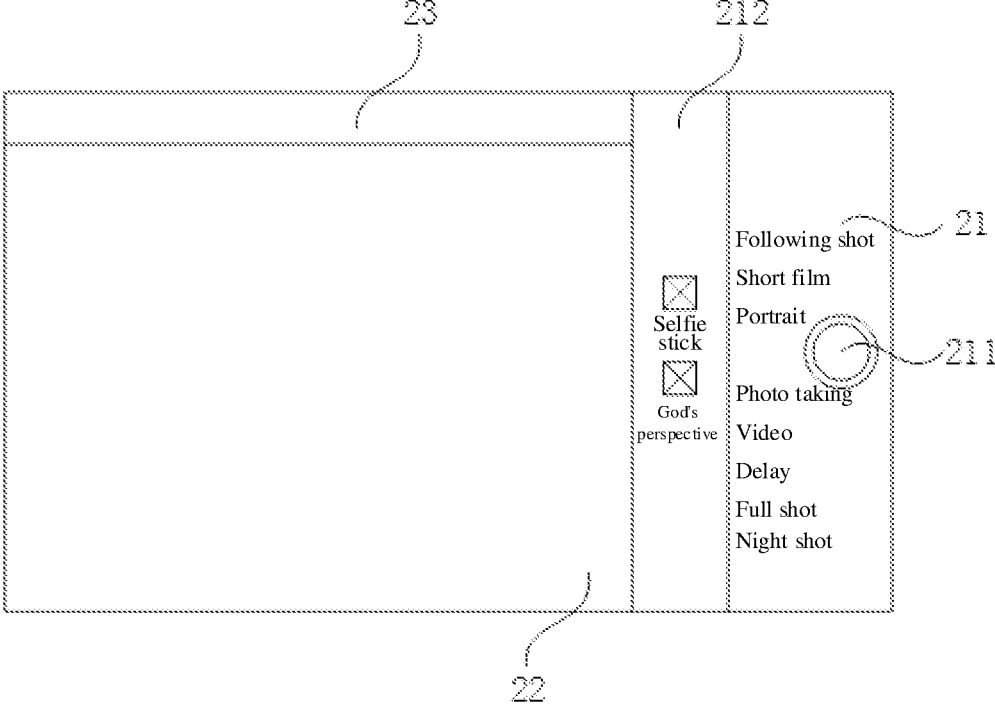
FIG. 3 is a schematic structural diagram of an interaction interface displaying a specific portrait mode selection sub-control interface according to at least one embodiment of the present disclosure.

The aerial vehicle may be any man-made flying object that can fly off the ground, fly in space and be artificially controlled. Specifically, an example in which the aerial vehicle is controlled by a mobile phone is described. After the mobile phone is connected to the aerial vehicle by a remote controller, the aerial vehicle can be controlled by an Application (APP) installed on the mobile phone. After entering the APP, a user can be provided with an interaction interface shown in FIG. 2, and the interaction interface includes a control interface 21, a shooting picture display interface 22, and a status bar 23, wherein the control interface 21 includes various mode selection controls, such as a following shot mode, a short film mode, a portrait mode, a photo taking mode, a video mode, a delay mode, a full shot mode, and a night shot mode, and further includes a shooting starting button 211; the user can select a required mode by the mode selection controls, and can take photos or photograph in a corresponding mode by pressing down the shooting starting button 211; besides, the control interface 21 may further include controls with a gallery function, an image parameter setting function and more functions, which can be respectively configured to open a gallery, set image parameters, start more functional options, etc. The shooting picture display interface 22 is configured to display a shooting picture of the aerial vehicle in real time, the status bar 23 can be configured to display some common statuses of the mobile phone, such as signal intensity, power, an aspect ratio of a picture, etc., the status bar 23 can be transparent, that is, the shooting picture display interface 22 cannot be shielded except contents that need to be displayed so that the view of the picture display is expanded. After entering the APP, the user can select a portrait mode control by sliding or clicking to generate the portrait shooting instruction, or select a portrait mode control by sliding or clicking to enter the selection of a specific portrait mode. As shown in FIG. 3, after the user selects the portrait mode, the control interface 21 can leftwards extend out of a sub-control interface 212, the sub-control interface 212 may include a specific portrait mode control, such as a selfie stick mode and a god's perspective mode, and the user can select one of the specific portrait mode controls by sliding or clocking as required to generate the portrait shooting instruction. After the portrait shooting instruction from the user is received, the aerial vehicle can be controlled to enter the portrait mode according to the portrait shooting instruction, so that subsequent steps are performed. The portrait mode can more highlight a shooting focus, for example, the shooting target can be highlighted by blurring a background image, and the shooting target may be persons, small animals, various inanimate objects, etc. When the user selects the portrait mode control or specific portrait mode control, display styles, such as color change, thickening, tilting or displacement, of the corresponding controls can be altered to prompt the user the current selected mode. When the user selects the portrait mode control, as shown in FIG. 3, the portrait mode control can also be aligned to the shooting starting button 211 to attract attention from the user.

S12, when the aerial vehicle has taken off, an actual distance between the aerial vehicle and the user is acquired, and the actual distance is compared with a preset distance.

Specifically, after the aerial vehicle is controlled to enter the portrait mode, it can be firstly determined whether the current aerial vehicle has completed takeoff, so that different actions are performed under different conditions. If the aerial vehicle has taken off, it can be determined whether the current position of the aerial vehicle is suitable for shooting in the portrait mode, specifically, the determination can be performed by acquiring the actual distance between the aerial vehicle and the user, and comparing the actual distance with the preset distance (such as 30 s), when the distance is overlong, that is, the distance exceeds the preset distance, it is possible that the shooting target in the shooting picture of the aerial vehicle cannot be locked, and then, the portrait mode cannot be used. The user is a user operating and controlling a remote controller of the aerial vehicle, the actual distance between the aerial vehicle and the user can be determined by acquiring a distance between the aerial vehicle and the remote controller or an electronic device (such as a mobile phone) connected to the remote controller.

Optionally, after the step that a portrait shooting instruction from a user is received, and an aerial vehicle is controlled to enter a portrait mode according to the portrait shooting instruction, the method further includes: when the aerial vehicle does not take off, the aerial vehicle is controlled to move to a default relative position after the user confirms that the aerial vehicle takes off. Specifically, in a status that the aerial vehicle does not take off, the aerial vehicle can also enter the portrait mode, specifically, after the aerial vehicle is controlled to enter the portrait mode, when it is determined that the aerial vehicle does not complete takeoff, the aerial vehicle automatically moves to the default relative position after the user confirms that the aerial vehicle takes off later, the default relative position may be a default relative position between the aerial vehicle and the remote controller or electronic device, and may be specifically a default height position from the user for a default distance under the condition that a lens of the aerial vehicle can face the obverse side of the user, so that the aerial vehicle can directly move to a position adapted to the portrait mode after taking off to provide greater convenience for the user.

S13, when the actual distance is greater than the preset distance, the aerial vehicle is controlled to move to a recommended position, wherein when the aerial vehicle is on the recommended position, a shooting picture of the aerial vehicle includes a shooting target.

Specifically, when the actual distance is greater than the preset distance, the aerial vehicle cannot be adapted to the portrait mode, at the moment, the aerial vehicle can be automatically controlled to move to the recommended position, and the lens of the aerial vehicle on the recommended position can face the obverse side of the user, so that the shooting picture can include the user after the aerial vehicle reaches the recommended position, wherein the user can belong to the shooting target, a general user performs operations by handholding the remote controller and the electronic device which are generally located in front of the user, the recommended position can be determined according to the relative position between the aerial vehicle and the remote controller or electronic device, and can be the same as the above-mentioned default relative position, and there may be different recommended positions in different specific portrait modes. Under the condition that the user shoots a portrait by using the aerial vehicle, the shooting picture of the aerial vehicle can be observed through a screen of the electronic device, and when the user has controlled the aerial vehicle to take off, generally, the position and lens direction of the aerial vehicle will be roughly adjusted according to the shooting picture to ensure that the shooting target is locked in the shooting picture. Therefore, when the above-mentioned actual distance is smaller than or equal to the preset distance, the aerial vehicle can be kept on the current position, or can move to a more appropriate position such as the recommended position according to a direction where the aerial vehicle faces the user.

Figure 4:
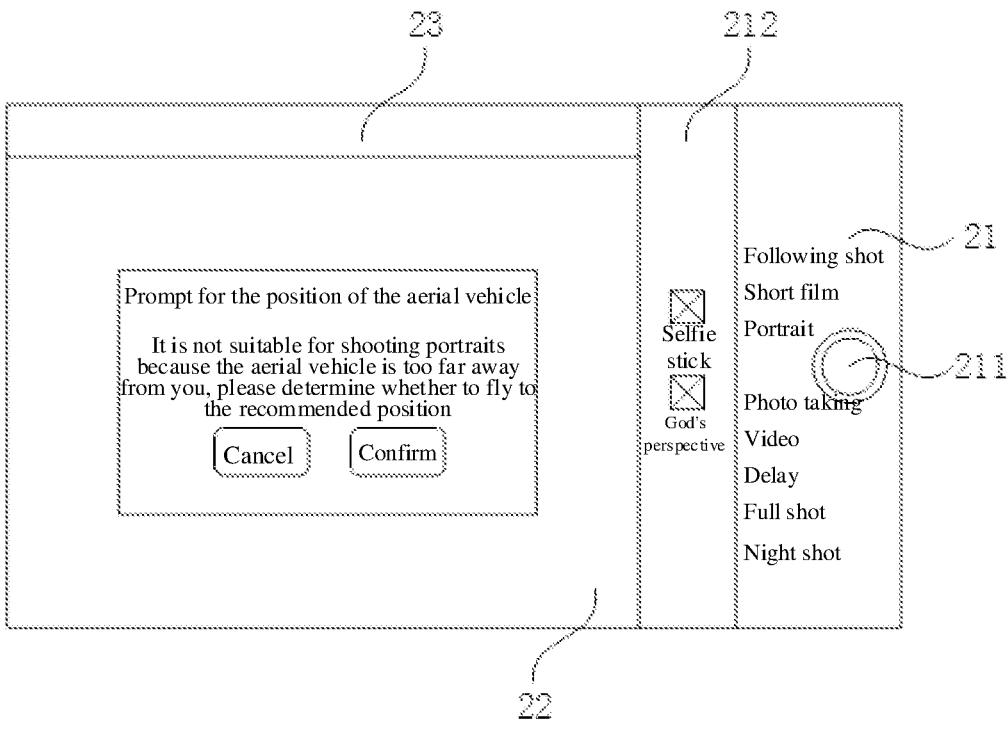
FIG. 4 is a schematic structural diagram of an interaction interface displaying a prompt pop-up window according to at least one embodiment of the present disclosure.

Optionally, as shown in FIG. 4, after it is determined that the actual distance is greater than the preset distance, it can be firstly inquired, through a pop-up window, whether a solution of automatical movement to the recommended position is enabled, and the aerial vehicle is controlled to move to the recommended position when the user confirms that the solution is enabled. Specifically, the user may be prompted with characters such as "it is not suitable for shooting portraits because the aerial vehicle is too far away from you, please determine whether to fly to the recommended position, and buttons for "cancel", "confirm", etc. are provided to be selected by the user; and if the user does not enable the solution, the position of the aerial vehicle can also be manually adjusted, a new position can be redetermined in real-time, so that it is determined whether further prompt is needed.

Optionally, in a process that the aerial vehicle voluntarily flies to the recommended position, introduction for the portrait mode and a used guide video can be displayed for the user through the screen of the electronic device, at the same time, the user can turn off the guide video at any time as required. Similarly, in a process that the aerial vehicle flies to the above-mentioned default relative position, or after the aerial vehicle flies to the above-mentioned default relative position, the guide video can also be displayed to the user so as to prompt the user to use the aerial vehicle. In the process that the aerial vehicle voluntarily flies to the recommended position, the user can be prompted with characters "the aerial vehicle is flying to the recommended position"; and after the aerial vehicle reaches the recommended position, the user can also be prompted with characters "the aerial vehicle has reached the recommended position" so as to perform subsequent actions.

S14, a shooting starting instruction from the user is received, and the shooting target is shot according to the shooting starting instruction.

Specifically, when the user confirms that shooting can be performed currently, the shooting starting instruction can be generated by pressing down the shooting starting button, or the shooting starting instruction can be issued by clicking on the remote controller and a voice assistant of a voice awakening application, and then, the aerial vehicle can be controlled to shoot the shooting target. The shooting starting instruction can include a photo taking instruction and a photographing instruction, etc, and then, a shooting way for the shooting target can be determined according to a content of the shooting starting instruction. When the shooting starting instruction is the photo taking instruction, the user can be prompt to take a photo by countdown (such as 3 s), and the photo is taken when the countdown is ended, at the same time, a photo taking prompt tone can be accompanied. When the shooting starting instruction is a photographing mode, photographing can be directly started, at the same time, the user can be prompted, with a photographing prompt tone or characters, that photographing has started, then, photographing can be ended when the shooting starting instruction from the user is received again or the photographing duration has reached a preset duration (such as 30 s), the user is prompted that photographing has been ended, and during photographing, a recording function of the electronic device can be started to satisfy a daily life recording demand of the user. After the photographing process is completed, the taken photo or video can be saved in a photo album no matter which shooting starting instruction is adopted.

Figure 5:
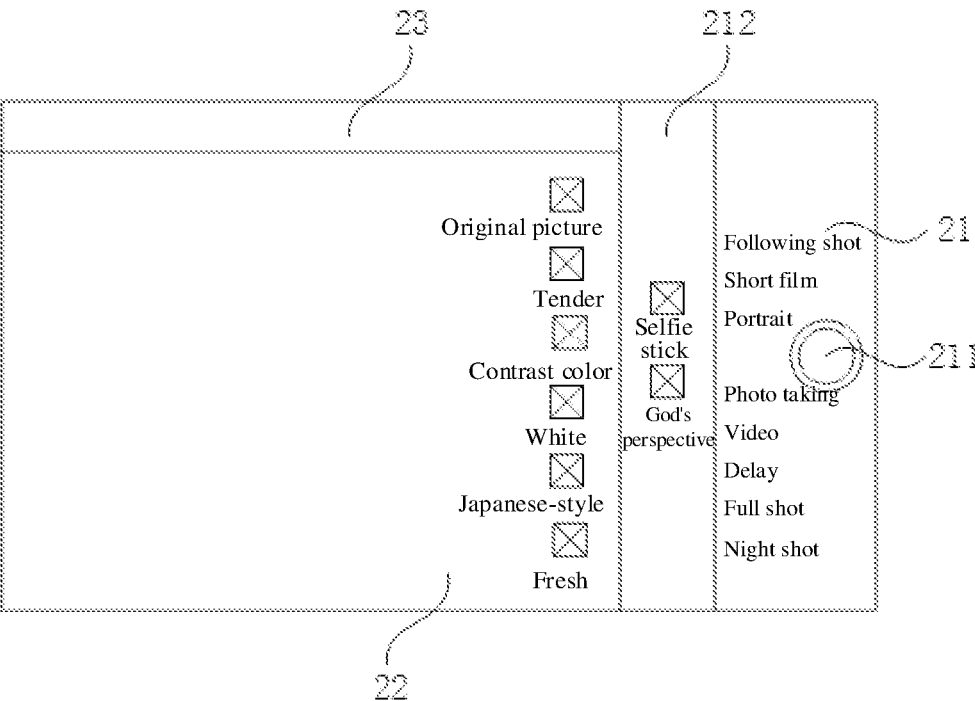
FIG. 5 is a schematic structural diagram of an interaction interface displaying a filter selection control according to at least one embodiment of the present disclosure.

Optionally, before the step that a shooting starting instruction from the user is received, and the shooting target is shot according to the shooting starting instruction, as shown in FIG. 5, a filter selection control which can specifically include an original picture mode, a tender mode, a contrast color mode, a white mode, a Japanese-style mode, a clear mode, etc. can be provided for the user at one side of the shooting picture display interface 22, and the user can select a required filter by the filter selection control to modify a picture, thereby further improving user experience, wherein the original picture mode can be used by default. Specifically, the filter selection control can be displayed to the user after the aerial vehicle reaches the recommended position or the default relative position, or the guide video is played, so as to more conform to a use habit of the user. In addition, before the step that a shooting starting instruction from the user is received, and the shooting target is shot according to the shooting starting instruction, a background except the shooting target can also be blurred to highlight the shooting target, at the same time, a blurring degree adjustment control can be provided for the user, so that the user can adjust the blurring degree of the background by the blurring degree adjustment control, thereby better satisfying diversified demands of the user.

Figure 6:
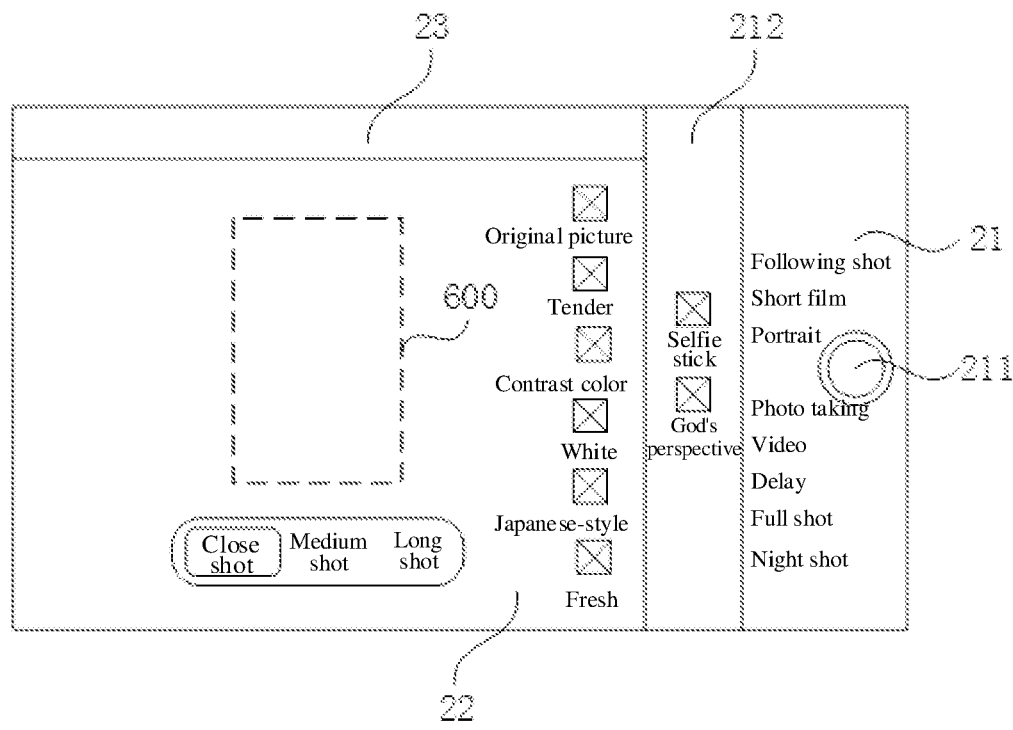
FIG. 6 is a schematic structural diagram of an interaction interface displaying a shot selection control according to at least one embodiment of the present disclosure.

On the basis of the above-mentioned technical solution, optionally, after the step that the aerial vehicle is controlled to move to a recommended position, the method further includes: a shot selection instruction from the user is received, and a shooting position of the aerial vehicle is adjusted according to the shot selection instruction. Specifically, after the aerial vehicle is controlled to move to the recommended position, the user can select the shooting target from the current shooting picture of the aerial vehicle, or can automatically recognize the shooting target. Specifically, a portrait of the user and all portraits closer to the portrait of the user can be determined as shooting targets, etc., or small animals, etc., in the current shooting picture can be simultaneously determined as shooting targets, so that a demand of taking a group photo for the user and a pet is better satisfied. After the shooting target is determined, as shown in FIG. 6, the shooting target can be identified by a locking box 600, and a shot selection control which can specifically include a close shot selection control, a medium shot selection control, a long shot selection control, etc. can be displayed to the user right below the locking box 600, and then, the user can click on a specific shot selection control to generate the shot selection instruction to determine a required shot. Sizes of the shooting target in an entire image in different shots are different, which can be specifically realized by adjusting the shooting position of the aerial vehicle, and a corresponding relation between each of various shots and the shooting position can be prestored, so that adjustment can be performed as required. After the shot selection instruction from the user is received, the shooting position of the aerial vehicle can be adjusted according to the shot selection instruction, specifically, a flight height of the aerial vehicle and a distance between the aerial vehicle and the shooting target can be adjusted. After the adjustment process is completed, the user can be prompted, with characters, that shot adjustment has been completed.

Alternatively, after the controlling the aerial vehicle to move to a recommended position, the method further includes:

receiving a shot selection instruction from the user, and adjusting a shooting position of the aerial vehicle according to the shot selection instruction.

Alternatively, after the controlling the aerial vehicle to move to a recommended position, the method further includes:

acquiring a current shooting picture of the aerial vehicle, and locking the shooting target in the current shooting picture by using a locking box;

accordingly, the adjusting a shooting position of the aerial vehicle according to the shot selection instruction includes:

determining, according to an area ratio of the locking box in the current shooting picture, a target shooting position corresponding to the shot selection instruction.

Alternatively, after the controlling the aerial vehicle to move to a recommended position, the method further includes:

acquiring a current shooting picture of the aerial vehicle, and displaying the current shooting picture to the user so that the user selects the shooting target from the current shooting picture.

Alternatively, the shooting target includes persons, and after the displaying the current shooting picture to the user so that the user selects the shooting target from the current shooting picture, the method further includes:

determining the number of target persons in the shooting target selected by the user, and automatically matching a target shot according to the number of the target persons; and adjusting the shooting position of the aerial vehicle according to the target shot.

Alternatively, the adjusting the shooting position of the aerial vehicle according to the target shot includes:

determining, according to a distance between the aerial vehicle and the shooting target, a target shooting position corresponding to the target shot.

Alternatively, after the receiving a portrait shooting instruction from a user, and controlling an aerial vehicle to enter a portrait mode according to the portrait shooting instruction, the method further includes:

when the aerial vehicle does not take off, controlling the aerial vehicle to move to a default relative position after the user confirms that the aerial vehicle takes off. Further optionally, after the step that the aerial vehicle is controlled to move to a recommended position, the method further includes: a current shooting picture of the aerial vehicle is acquired, and the shooting target in the current shooting picture is locked by using a locking box; accordingly, the step that a shooting position of the aerial vehicle is adjusted according to the shot selection instruction includes: a target shooting position corresponding to the shot selection instruction is determined according to an area ratio of the locking box in the current shooting picture. Specifically, the aerial vehicle can shoot a picture in front of the lens in real time, and transmit the picture to the electronic device, so that the electronic device can acquire the current shooting picture of the aerial vehicle. After the current shooting picture is acquired, as shown in FIG. 6, the shooting target can be locked by using the locking box 600, that is, it is always ensured that the shooting target is located in the locking box 600, wherein the size of the locking box 600 can be determined according to the size of the shooting target, and can be a rectangular box basically just wrapping the shooting target, and then, the target shooting position corresponding to the shot selection instruction can be determined according to the size of the locking box 600. Specifically, the target shooting position can be determined according to the area ratio of the locking box 600 in the entire current shooting picture, and a corresponding relation between each of various shots and the area ratio can be prestored; then, after the shot selection instruction from the user is received, the shooting target is focused and locked firstly, then, a corresponding target area ratio is determined according to a selected specific shot, and the position of the aerial vehicle is continuously adjusted according to the target area ratio until the area ratio of the locking box for the shooting target in the shooting picture of the aerial vehicle in the entire shooting picture reaches the target area ratio, and thus, the required target shooting position can be determined. Optionally, after the target is locked, the user can be firstly inquired whether to adjust the shooting position of the aerial vehicle according to the selected shot. Particularly, the shooting target can include a plurality of portraits, the size of the locking box varies with the number of persons, and the ratio thereof in the picture will also be different, but a single-person close shot can also satisfy a demand on close-shot shooting for three or fewer persons. Therefore, when the number of the persons is three or below, the shooting position of the aerial vehicle can be adjusted by a locking box for single person (who can be a user controlling the aerial vehicle), at the same time, the user is also allowed to adjust the position of the locking box for single person in a locking box for three persons, so that an adjustment demand of the user before shooting is satisfied to the maximum extent.

Figure 7:
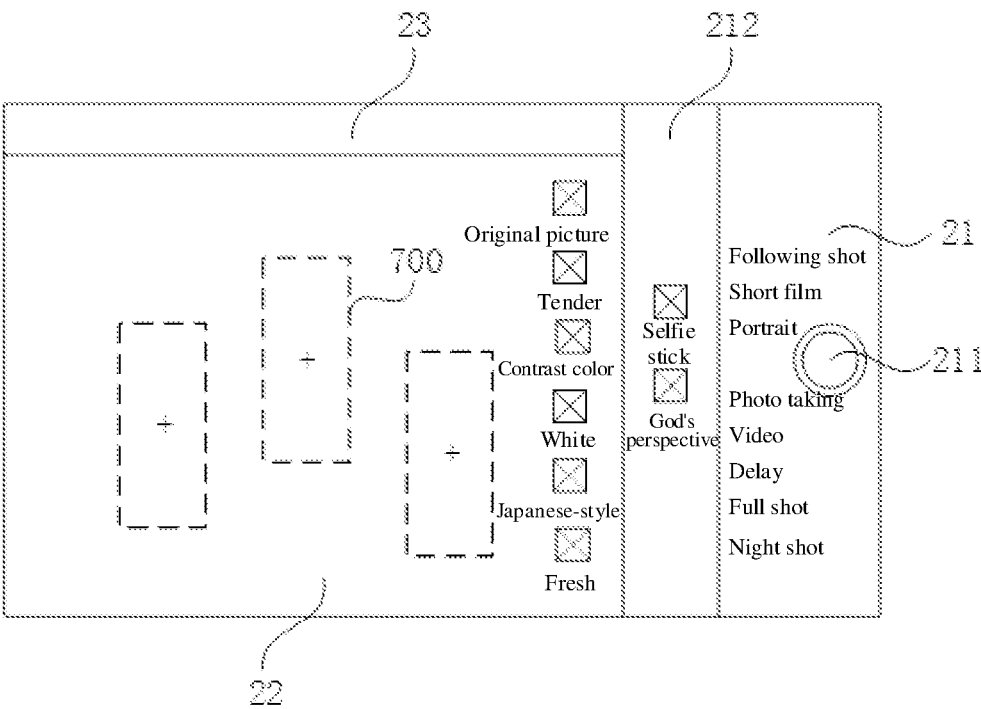
FIG. 7 is a schematic structural diagram of an interaction interface displaying a portrait identification box according to at least one embodiment of the present disclosure.

On the basis of the above-mentioned technical solution, optionally, after the step that the aerial vehicle is controlled to move to a recommended position, the method further includes: a current shooting picture of the aerial vehicle is acquired, and the current shooting picture is displayed to the user so that the user selects the shooting target from the current shooting picture. Specifically, after the aerial vehicle is controlled to move to the recommended position, the aerial vehicle can shoot the picture in front of the lens in real time, and transmit the picture to the electronic device, so that the electronic device can acquire the current shooting picture of the aerial vehicle, and then display the current shooting picture by means of a shooting picture display interface, and the user can determine the required shooting target from the current shooting picture by observing the current shooting picture, and can perform selection by means of clicking or box-selection, etc. Further, as shown in FIG. 7, after the current shooting picture of the aerial vehicle is acquired, all persons and small animals, etc. can be automatically recognized from the current shooting picture, and can be respectively identified with identification boxes 700, and then, a target selected by the user can be determined as the shooting target. "+" can be used for indication in the identification boxes 700 to facilitate rapid selection from the user, and the user can determine the shooting target to be selected by clicking on "+" or box-selecting the required identification boxes 700. The identification boxes 700 are selectable, so that the user can select a required number of targets.

Further optionally, the shooting target includes persons, and after the step that the current shooting screen is displayed to the user so that the user selects the shooting target from the current shooting screen, the method further includes: the number of target persons in the shooting target selected by the user is determined, and a target shot is automatically matched according to the number of the target persons; and the shooting position of the aerial vehicle is adjusted according to the target shot. Specifically, the number of the target persons selected by the user can be selected according to the number of portrait identification boxes clicked or box-selected by the user, and then, the target shot can be automatically matched according to the number of the target persons. Specifically, a long shot can be selected when there are more target persons, and a close shot can be selected when there are fewer target persons, so that ratios of the shooting target and each portrait therein in the entire image is more appropriate. After the target shot is determined, the shooting position of the aerial vehicle can be adjusted according to the target shot. Optionally, the step that the shooting position of the aerial vehicle is adjusted according to the target shot includes: a target shooting position corresponding to the target shot is determined according to a distance between the aerial vehicle and the shooting target. Specifically, a corresponding relation between the shot and the distance can be prestored, after the target shot is determined, a corresponding target distance can be determined, then, the aerial vehicle is moved to the target shooting position according to the target distance, at the same time, a corresponding target height can also be determined, and the aerial vehicle is moved to the target height, so that the target shooting position is better determined. By automatically determining the shot and automatically adjusting the shooting position of the aerial vehicle, the shooting efficiency of the user is increased, determinations made by the user are reduced, and then, convenience is further provided for the user.

According to the technical solution provided in the embodiment of the present disclosure, firstly, a portrait shooting instruction from a user is received, and an aerial vehicle is controlled to enter a portrait mode according to the portrait shooting instruction; then, it is determined whether the aerial vehicle has completed takeoff; if yes, an actual distance between the aerial vehicle and the user is acquired, and the actual distance is compared with a preset distance; if the actual distance is greater than the preset distance, the aerial vehicle is controlled to move to a recommended position, wherein when the aerial vehicle is on the recommended position, a shooting picture of the aerial vehicle includes a shooting target; and then, a shooting starting instruction from the user can be received, and then, the shooting target is shot according to the shooting starting instruction. By automatically determining whether a distance between the aerial vehicle that has completed takeoff and the user is adapted to the portrait mode, and automatically controlling the aerial vehicle to move to a shooting position adapted to the portrait mode when conditions are not satisfied, shooting based on the portrait mode of the aerial vehicle is realized conveniently, user operations are reduced, great convenience is provided for the user, and the shooting effect of the portrait mode is also improved.

Figure 8:
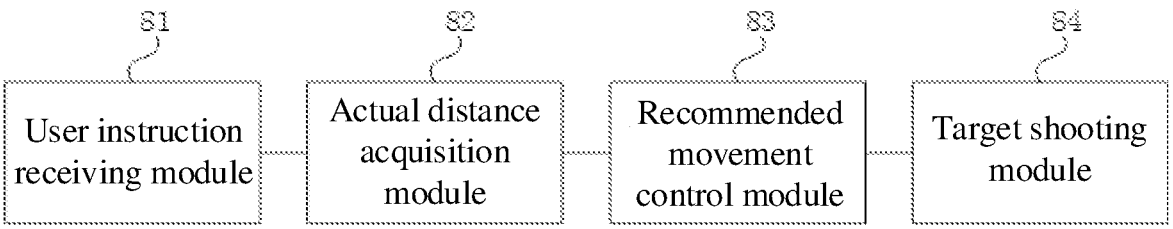
FIG. 8 is a schematic structural diagram of an apparatus for controlling an aerial vehicle to shoot based on a portrait mode according to at least an additional embodiment of the present disclosure.

FIG. 8 is a schematic structural diagram of an apparatus for controlling an aerial vehicle to shoot based on a portrait mode according to embodiment 2 of the present disclosure. The apparatus can be implemented by means of hardware and/or software, and can be generally integrated in an electronic device and configured to perform the method for controlling an aerial vehicle to shoot based on a portrait mode according to any embodiment of the present disclosure. As shown in FIG. 8, the apparatus includes:

a user instruction receiving module 81 configured to receive a portrait shooting instruction from a user, and control an aerial vehicle to enter a portrait mode according to the portrait shooting instruction;

an actual distance acquisition module 82 configured to, if the aerial vehicle has taken off, acquire an actual distance between the aerial vehicle and the user, and compare the actual distance with a preset distance;

a recommended movement control module 83 configured to, if the actual distance is greater than the preset distance, control the aerial vehicle to move to a recommended position, wherein when the aerial vehicle is on the recommended position, a shooting picture of the aerial vehicle includes a shooting target; and a target shooting module 84 configured to receive a shooting starting instruction from the user, and shoot the shooting target according to the shooting starting instruction.

According to the technical solution provided in the embodiment of the present disclosure, firstly, a portrait shooting instruction from a user is received, and an aerial vehicle is controlled to enter a portrait mode according to the portrait shooting instruction; then, it is determined whether the aerial vehicle has completed takeoff; if yes, an actual distance between the aerial vehicle and the user is acquired, and the actual distance is compared with a preset distance; if the actual distance is greater than the preset distance, the aerial vehicle is controlled to move to a recommended position, wherein when the aerial vehicle is on the recommended position, a shooting picture of the aerial vehicle includes a shooting target; and then, a shooting starting instruction from the user can be received, and then, the shooting target is shot according to the shooting starting instruction. By automatically determining whether a distance between the aerial vehicle that has completed takeoff and the user is adapted to the portrait mode, and automatically controlling the aerial vehicle to move to a shooting position adapted to the portrait mode when conditions are not satisfied, shooting based on the portrait mode of the aerial vehicle is realized conveniently, user operations are reduced, great convenience is provided for the user, and the shooting effect of the portrait mode is also improved.

On the basis of the above-mentioned technical solution, optionally, the apparatus for controlling the aerial vehicle to shoot based on the portrait mode further includes:

a shot determination module configured to, after the controlling the aerial vehicle to move to a recommended position, receive a shot selection instruction from the user, and adjust a shooting position of the aerial vehicle according to the shot selection instruction.

On the basis of the above-mentioned technical solution, optionally, the apparatus for controlling the aerial vehicle to shoot based on the portrait mode further includes:

a shooting target locking module configured to acquire a current shooting picture of the aerial vehicle, and lock the shooting target in the current shooting picture by using a locking box;

accordingly, the shot determination module is specifically configured to:

determine, according to an area ratio of the locking box in the current shooting picture, a target shooting position corresponding to the shot selection instruction.

On the basis of the above-mentioned technical solution, optionally, the apparatus for controlling the aerial vehicle to shoot based on the portrait mode further includes:

a shooting target selection module configured to, after the controlling the aerial vehicle to move to a recommended position, acquire a current shooting picture of the aerial vehicle, and display the current shooting picture to the user so that the user selects the shooting target from the current shooting picture.

On the basis of the above-mentioned technical solution, optionally, the shooting target includes persons, and the apparatus for controlling the aerial vehicle to shoot based on the portrait mode further includes:

a shot matching module configured to, after the displaying the current shooting picture to the user so that the user selects the shooting target from the current shooting picture, determine the number of target persons in the shooting target selected by the user, and automatically match a target shot according to the number of the target persons; and a shooting position adjustment module configured to adjust the shooting position of the aerial vehicle according to the target shot.

On the basis of the above-mentioned technical solution, optionally, the shooting position adjustment module is specifically configured to:

determine, according to a distance between the aerial vehicle and the shooting target, a target shooting position corresponding to the target shot.

On the basis of the above-mentioned technical solution, optionally, the apparatus for controlling the aerial vehicle to shoot based on the portrait mode further includes:

a default movement control module configured to, after the receiving a portrait shooting instruction from a user, and controlling an aerial vehicle to enter a portrait mode according to the portrait shooting instruction, if the aerial vehicle does not take off, control the aerial vehicle to move to a default relative position after the user confirms that the aerial vehicle takes off.

The apparatus for controlling the aerial vehicle to shoot based on the portrait mode according to the embodiment of the present disclosure can perform the method for controlling the aerial vehicle to shoot based on the portrait mode according to any embodiment of the present disclosure, and has corresponding functional modules and beneficial effects of the performed the method.

It is noteworthy that all the units and modules included in the embodiment of the above-mentioned apparatus for controlling the aerial vehicle to shoot based on the portrait mode are only divided according to a functional logic, but are not limited to the above-mentioned division as long as the corresponding functions can be realized; in addition, specific names of all the functional units are only intended to facilitate mutual distinguishing, rather than to limit the protective scope of the present disclosure.

Figure 9:
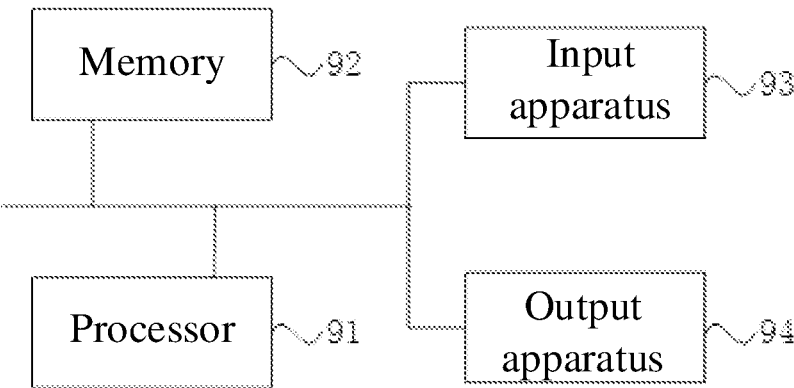
FIG. 9 is a schematic structural diagram of an electronic device according to at least a further embodiment of the present disclosure.

FIG. 9 is a schematic structural diagram of an electronic device according to embodiment 3 of the present disclosure, and shows a block diagram of an exemplary electronic device suitable for implementing the implementation of the present disclosure. The electronic device shown in FIG. 9 is only an example, and should not bring any limitations on functions and application ranges of the embodiment of the present disclosure. As shown in FIG. 9, the electronic device includes a processor 91, a memory 92, an input apparatus 93, and an output apparatus 94; there may be one or more processors 91 in the electronic device. In FIG. 9, with one processor 91 as an example, the processor 91, the memory 92, the input apparatus 93 and the output apparatus 94 in the electronic device can be connected by a bus or other ways, and are exemplarily connected by the bus in FIG. 9.

The memory 92 serving as a computer-readable storage medium can be configured to store software programs, computer-executable programs, and modules, such as program instructions/modules corresponding to the method for controlling the aerial vehicle to shoot based on the portrait mode in the embodiment of the present disclosure (such as the user instruction receiving module 81, the actual distance acquisition module 82, the recommended movement control module 83 and the target shooting module 84 in the apparatus for controlling the aerial vehicle to shoot based on the portrait mode). By running the software programs, instructions and modules stored in the memory 92, the processor 91 performs various functional applications and data processing of the electronic device, that is, the processor 91 implements the above-mentioned method for controlling the aerial vehicle to shoot based on the portrait mode.

The memory 92 can mainly include a program storage region and a data storage region, wherein the program storage region can store an operating system and an application required by at least one function; and the data storage region can store data created according to the application of the electronic device, etc. The memory 92 can include a high-speed random access memory, and can also include a nonvolatile memory, such as at least one magnetic disk memory, a flash memory device, or other nonvolatile solid-state memory devices. In some examples, the memory 92 can further include memories remotely disposed relative to the processor 91, and these remote memories can be connected to the electronic device by a network. Examples of the above-mentioned network include, but are not limited to an internet, an intranet, a local area network, a mobile communication network, and combinations thereof.

The input apparatus 93 can be configured to receive a portrait shooting instruction and a shooting starting instruction from a user, and generate key signal inputs, etc. related to user setting and function control of the electronic device. The output apparatus 94 can include a device such as a display screen, and can be configured to provide a human-computer interaction interface to the user so as to display a shooting picture, guide contents, etc. to the user.

Embodiment 4 of the present disclosure further provides a storage medium including a computer-executable instruction, wherein the computer-executable instruction, when executed by a processor of a computer, is configured to perform the method for controlling the aerial vehicle to shoot based on the portrait mode, and the method includes:

a portrait shooting instruction from a user is received, and an aerial vehicle is controlled to enter a portrait mode according to the portrait shooting instruction;

when the aerial vehicle has taken off, an actual distance between the aerial vehicle and the user is acquired, and the actual distance is compared with a preset distance;

when the actual distance is greater than the preset distance, the aerial vehicle is controlled to move to a recommended position, wherein when the aerial vehicle is on the recommended position, a shooting picture of the aerial vehicle includes a shooting target; and a shooting starting instruction from the user is received, and the shooting target is shot according to the shooting starting instruction.

The storage medium may be any one of various types of memory devices or storage devices. The term "storage medium" is intended to include: an installation medium, such as a CD-ROM, a floppy disk or a magnetic tape apparatus; a computer system memory or random access memory, such as DRAM, DDR RAM, SRAM, EDO RAM, and Rambus RAM; a nonvolatile memory, such as a flash memory and a magnetic medium (such as a hard disk or optical memory); and a register or other similar types of memory components, etc. The storage medium can further include other types of memories or combinations thereof. In addition, the storage medium can be located in a computer system in which programs are executed, or can be located in different second computer systems connected to the computer system by a network (such as an Internet). The second computer systems can provide program instructions to computers for execution. The term "storage medium" can include two or more storage media which can stay on different positions (such as different computer systems connected by a network). The storage medium can store a program instruction (for example, which is specifically implemented as a computer program) which can be executed by one or more processors.

Of course, a computer-executable instruction of the storage medium including the computer-executable instruction according to the embodiment of the present disclosure is not limited to the operations of the above-mentioned method, and can also include relevant operations in the method for controlling the aerial vehicle to shoot based on the portrait mode according to any embodiment of the present disclosure.

A computer-readable signal medium may include a data signal propagated in a baseband or as a part of a carrier, and carries computer-readable program codes. The data signal propagated in such a way may adopt various forms which include, but are not limited to an electromagnetic signal, an optical signal or any appropriate combinations thereof. The computer-readable signal medium may be further any computer-readable medium except a computer-readable storage medium, and the computer-readable medium can send, propagate or transmit programs used by an instruction execution system, apparatus or device or used in combination with the same.

The program codes included on the computer-readable medium can be transmitted by any appropriate mediums which include, but are not limited to radio, an electric wire, an optical cable, and an RF, or any appropriate combinations thereof.

Through above descriptions for the implementations, it can be clearly known by the skilled in the art that the present disclosure can be implemented by means of software and essential general-purpose hardware, of course, it can also be implemented by means of hardware, however, the former is the better implementation under many conditions. Based on such understanding, essences of the technical solutions of the present disclosure or parts thereof making contributions to the prior art can be embodied in a form of a software product, and the computer software product may be stored in a computer-readable storage medium, such as a floppy disk, a Read-Only Memory (ROM), a Random Access Memory (RAM), a flash memory (FLASH), a hard disk or an optical disk of a computer, and includes a plurality of instructions used to enable an electronic device (which may be a personal computer, a server, or a network device, etc.) to perform the method in each of the embodiments.

An embodiment of the present disclosure provides a method for controlling an aerial vehicle to shoot based on a portrait mode, by which, firstly, a portrait shooting instruction from a user is received, and an aerial vehicle is controlled to enter a portrait mode according to the portrait shooting instruction; then, it is determined whether the aerial vehicle has completed takeoff; if yes, an actual distance between the aerial vehicle and the user is acquired, and the actual distance is compared with a preset distance; if the actual distance is greater than the preset distance, the aerial vehicle is controlled to move to a recommended position, wherein when the aerial vehicle is on the recommended position, a shooting picture of the aerial vehicle includes a shooting target; and then, a shooting starting instruction from the user can be received, and then, the shooting target is shot according to the shooting starting instruction. According to the method for controlling the aerial vehicle to shoot based on the portrait mode according to the embodiment of the present disclosure, by automatically determining whether a distance between the aerial vehicle that has completed takeoff and the user is adapted to the portrait mode, and automatically controlling the aerial vehicle to move to a shooting position adapted to the portrait mode when conditions are not satisfied, shooting based on the portrait mode of the aerial vehicle is realized conveniently, user operations are reduced, great convenience is provided for the user, and the shooting effect of the portrait mode is also improved.

It is noted that preferred embodiments of the present disclosure and applied technical principles are only described above. It can be understood by the skilled in the art that the present disclosure is not limited to the specific embodiments described herein, and various obvious changes, readjustments or substitutions can be made by the skilled in the art without departing from the protective scope of the present disclosure. Therefore, although the present disclosure has been described in more detail with above embodiments, the present disclosure is not only limited to the above embodiments, but can further include more other equivalent embodiments without departing from the concept of the present disclosure, and the scope of the present disclosure is determined by the scope of the appended claims.

What is claimed is:

1. A shooting method for portrait mode, performed by an aerial vehicle, comprising:

receiving a portrait shooting instruction from a user, and controlling an aerial vehicle to enter a portrait mode according to the portrait shooting instruction;

when the aerial vehicle has taken off, acquiring an actual distance between the aerial vehicle and the user, and comparing the actual distance with a preset distance;

when the actual distance is greater than the preset distance, controlling the aerial vehicle to move to a recommended position, wherein when the aerial vehicle is on the recommended position, a shooting picture of the aerial vehicle comprises a shooting target, the shooting target comprising one or more target persons;

acquiring a current shooting picture of the aerial vehicle, and displaying the current shooting picture to the user so that the user selects the shooting target from the current shooting picture;

determining a number of the one or more target persons in the shooting target selected by the user, and automatically matching a target shot according to the number of the one or more target persons in the shooting picture;

adjusting a shooting position of the aerial vehicle according to the target shot; and receiving a shooting starting instruction from the user, and shooting the shooting target according to the shooting starting instruction.

2. The shooting method according to claim 1, wherein after the controlling the aerial vehicle to move to the recommended position, the method further comprises:

receiving a shot selection instruction from the user, and adjusting a shooting position of the aerial vehicle according to the shot selection instruction.

3. The shooting method according to claim 2, wherein after the controlling the aerial vehicle to move to the recommended position, the method further comprises:

acquiring a current shooting picture of the aerial vehicle, and locking the shooting target in the current shooting picture by using a locking box;

accordingly, the adjusting a shooting position of the aerial vehicle according to the shot selection instruction comprises:

determining, according to an area ratio of the locking box in the current shooting picture, a target shooting position corresponding to the shot selection instruction.

4. The shooting method for portrait mode according to claim 1, wherein the adjusting the shooting position of the aerial vehicle according to the target shot comprises:

determining, according to a distance between the aerial vehicle and the shooting target, the target shooting position corresponding to the target shot.

5. The shooting method for portrait mode according to claim 1, wherein after the receiving a portrait shooting instruction from a user, and controlling an aerial vehicle to enter the portrait mode according to the portrait shooting instruction, the method further comprises:

when the aerial vehicle does not take off, controlling the aerial vehicle to move to a default relative position after the user confirms that the aerial vehicle takes off.

6. The shooting method for portrait mode according to claim 1, wherein the number of the one or more target persons is determined according to a number of portrait identification boxes clicked or box-selected by the user.

7. An shooting apparatus for portrait mode, wherein a user instruction receiving module configured to receive a portrait shooting instruction from a user, and control an aerial vehicle to enter a portrait mode according to the portrait shooting instruction;

an actual distance acquisition module configured to compare the actual distance with a preset distance, when the aerial vehicle has taken off, acquire an actual distance between the aerial vehicle and the user;

a recommended movement control module configured to control the aerial vehicle to move to a recommended position, when the actual distance is greater than the preset distance, wherein when the aerial vehicle is on the recommended position, a shooting picture of the aerial vehicle comprises a shooting target, the shooting target comprising one or more target persons;

a shooting target selection module configured to acquire a current shooting picture of the aerial vehicle, and display the current shooting picture to the user so that the user selects the shooting target from the current shooting picture;

a shot matching module configured to determine a number of the one or more target persons in the shooting target selected by the user, and automatically match a target shot according to the number of the one or more target persons in the shooting picture;

a shooting position adjustment module configured to adjust the shooting position of the aerial vehicle according to the target shot; and a target shooting module configured to receive a shooting starting instruction from the user, and shoot the shooting target according to the shooting starting instruction.

8. The shooting apparatus according to claim 7, further comprising a shot determination module configured to:

after controlling the aerial vehicle to move to the recommended position, receive a shot selection instruction from the user, and adjust a shooting position of the aerial vehicle according to the shot selection instruction.

9. The shooting apparatus according to claim 8, further comprising a shooting target locking module configured to:

after controlling the aerial vehicle to move to the recommended position, acquire a current shooting picture of the aerial vehicle, and lock the shooting target in the current shooting picture by using a locking box;

the shot determination module is further configured to:

determine, according to an area ratio of the locking box in the current shooting picture, a target shooting position corresponding to the shot selection instruction.

10. The shooting apparatus according to claim 7, the shooting position adjustment module is further configured to:

determine, according to a distance between the aerial vehicle and the shooting target, a target shooting position corresponding to the target shot.

11. The shooting apparatus according to claim 7, further comprising a default movement control module configured to:

after receiving the portrait shooting instruction from the user, and controlling the aerial vehicle to enter the portrait mode according to the portrait shooting instruction, when the aerial vehicle does not take off, control the aerial vehicle to move to a default relative position after the user confirms that the aerial vehicle takes off.

12. The shooting apparatus according to claim 7, wherein the number of the one or more target persons is determined according to a number of portrait identification boxes clicked or box-selected by the user.

13. An electronic device, comprising:

one or more processors; and a memory configured to store one or more programs;

when the one or more programs are executed by the one or more processors, the one or more processors being enabled to implement a shooting method for portrait mode;

wherein the shooting method for portrait mode performed by an aerial vehicle, comprising:

receiving a portrait shooting instruction from a user, and controlling an aerial vehicle to enter a portrait mode according to the portrait shooting instruction;

when the aerial vehicle has taken off, acquiring an actual distance between the aerial vehicle and the user, and comparing the actual distance with a preset distance;

when the actual distance is greater than the preset distance, controlling the aerial vehicle to move to a recommended position, wherein when the aerial vehicle is on the recommended position, a shooting picture of the aerial vehicle comprises a shooting target, the shooting target comprising one or more target persons;

acquiring a current shooting picture of the aerial vehicle, and displaying the current shooting picture to the user so that the user selects the shooting target from the current shooting picture;

determining a number of the one or more target persons in the shooting target selected by the user, and automatically matching a target shot according to the number of the one or more target persons in the shooting picture;

adjusting a shooting position of the aerial vehicle according to the target shot; and receiving a shooting starting instruction from the user, and shooting the shooting target according to the shooting starting instruction.

14. The electronic device according to claim 13, wherein after the controlling the aerial vehicle to move to the recommended position, the method further comprises:

receiving a shot selection instruction from the user, and adjusting a shooting position of the aerial vehicle according to the shot selection instruction.

15. The electronic device according to claim 14, wherein after the controlling the aerial vehicle to move to the recommended position, the method further comprises:

acquiring a current shooting picture of the aerial vehicle, and locking the shooting target in the current shooting picture by using a locking box;

accordingly, the adjusting a shooting position of the aerial vehicle according to the shot selection instruction comprises:

determining, according to an area ratio of the locking box in the current shooting picture, a target shooting position corresponding to the shot selection instruction.

16. The electronic device for portrait mode according to claim 13, wherein the adjusting the shooting position of the aerial vehicle according to the target shot comprises:

determining, according to a distance between the aerial vehicle and the shooting target, a target shooting position corresponding to the target shot.

17. The electronic device according to claim 13, wherein the number of the one or more target persons is determined according to a number of portrait identification boxes clicked or box-selected by the user.

* * * * *